United States Patent
Gutman et al.

(10) Patent No.: US 12,323,928 B2
(45) Date of Patent: Jun. 3, 2025

(54) POWER ADJUSTMENT SIGNALING FOR REPEATERS

(71) Applicant: QUALCOMM Incorporated, San Diego, CA (US)

(72) Inventors: Igor Gutman, Hod HaSharon (IL); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 381 days.

(21) Appl. No.: 17/821,364

(22) Filed: Aug. 22, 2022

(65) Prior Publication Data
US 2024/0064656 A1     Feb. 22, 2024

(51) Int. Cl.
| | |
|---|---|
| H04W 52/36 | (2009.01) |
| H04W 8/22 | (2009.01) |
| H04W 52/46 | (2009.01) |
| H04W 52/52 | (2009.01) |

(52) U.S. Cl.
CPC ........... *H04W 52/367* (2013.01); *H04W 8/22* (2013.01); *H04W 52/46* (2013.01); *H04W 52/52* (2013.01)

(58) Field of Classification Search
CPC ... H04W 52/12; H04W 52/36; H04W 52/367; H04W 8/22; H04W 52/52; H04W 52/46; H04L 5/0048; H04L 5/001; H04L 5/0023; H04L 5/0032; H04L 5/0082; H04L 5/0091
See application file for complete search history.

(56) References Cited

U.S. PATENT DOCUMENTS

| | | | | |
|---|---|---|---|---|
| 2011/0149769 A1* | 6/2011 | Nagaraja | ............... | H04W 52/12 370/252 |
| 2014/0092792 A1* | 4/2014 | Kim | ...................... | H04L 5/0048 370/280 |
| 2015/0111608 A1* | 4/2015 | Kazmi | ................ | H04W 52/367 455/522 |
| 2021/0195535 A1* | 6/2021 | Wolf | ..................... | H04W 52/36 |

OTHER PUBLICATIONS

International Search Report and Written Opinion—PCT/US2023/028886—ISA/EPO—Nov. 7, 2023.
Ramanathan R., et al., "Topology Control of Multihop Wireless Networks Using Transmit Power Adjustment", INFOCOM 2000, Nineteenth Annual Joint Conference of the IEEE Computer and Communications Societies. Proceedings, IEEE Tel Aviv, Israel Mar. 26-30, 2000, Piscataway, NJ, USA, IEEE, US, vol. 2, Mar. 26, 2000, pp. 404-413, XP010376128, p. 1, p. 6-p. 7.

* cited by examiner

*Primary Examiner* — Vinncelas Louis
(74) *Attorney, Agent, or Firm* — Procopio, Cory, Hargreaves & Savitch

(57) ABSTRACT

A method for wireless communication at a wireless device and related apparatus are provided. In the method, the wireless device receives an indication of a power adjustment between a set of resource allocations from the first time instance to the second time instance. The set of resource allocations is associated with wireless communication between a network node and a user equipment (UE) via the wireless device. Then, the wireless device adjusts a power backoff (BO) of the wireless device based on the indication of the power adjustment between the set of resource allocations. The method provides power adjustment signaling to the wireless device to enable dynamic adjustment of the power BO of the wireless device based on the resource allocation of incoming signals. Hence, it improves the energy efficiency of the wireless device.

26 Claims, 14 Drawing Sheets

POWER ADJUSTMENT SIGNALING FOR REPEATERS

TECHNICAL FIELD

The present disclosure relates generally to communication systems, and more particularly, to methods and apparatus for power adjustment signaling for repeaters.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a memory and at least one processor coupled to the memory. Based at least in part on information stored in the memory, the at least one processor may be configured to receive an indication of a power adjustment between a set of resource allocations from a first time instance to a second time instance, where the set of resource allocations is associated with communication between a network node and a user equipment (UE) via the wireless device; and adjust a power backoff (BO) of the wireless device based on the indication of the power adjustment between the set of resource allocations.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
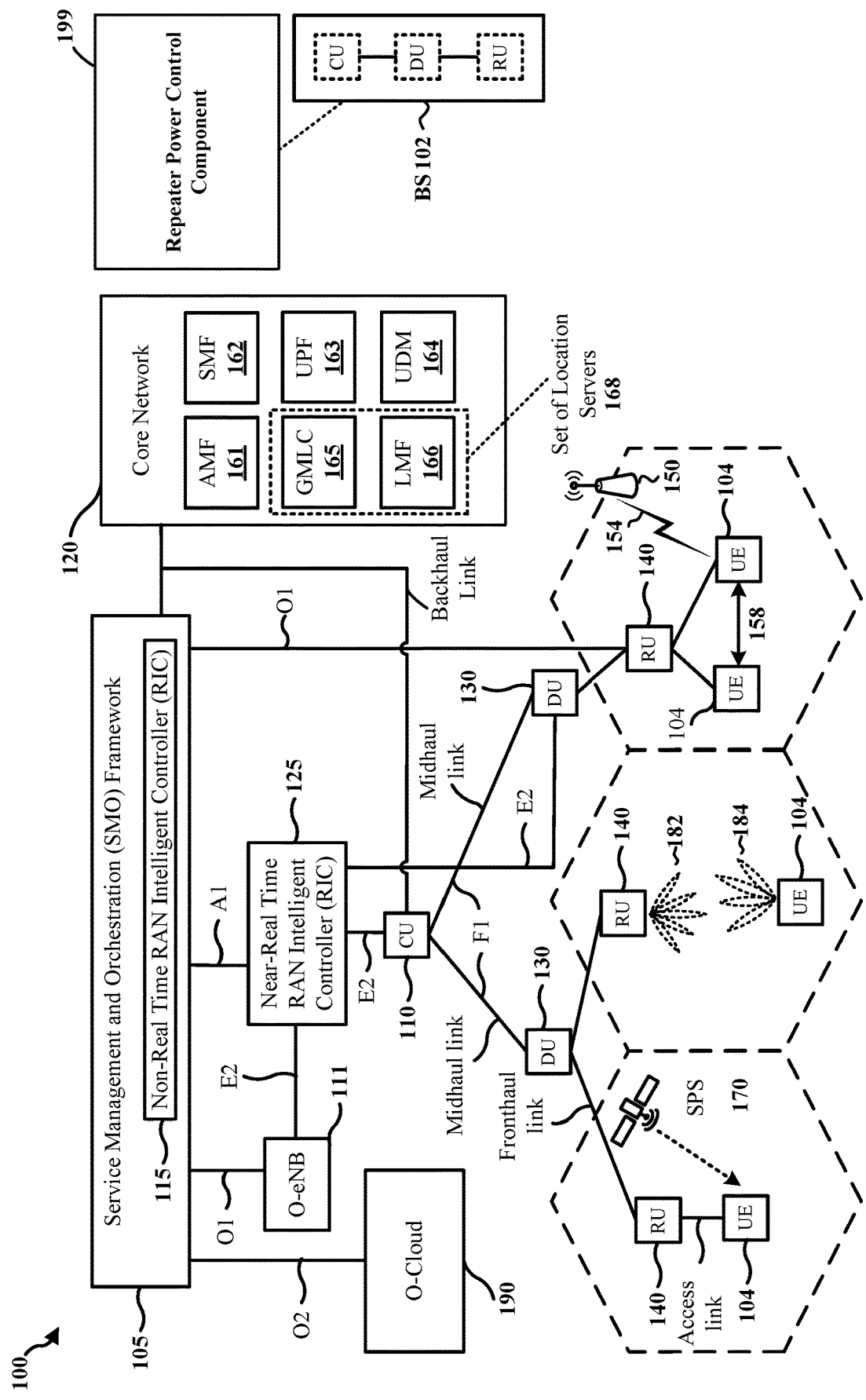
FIG. 1 is a diagram illustrating an example of a wireless communications system and an access network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5GNB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 3:
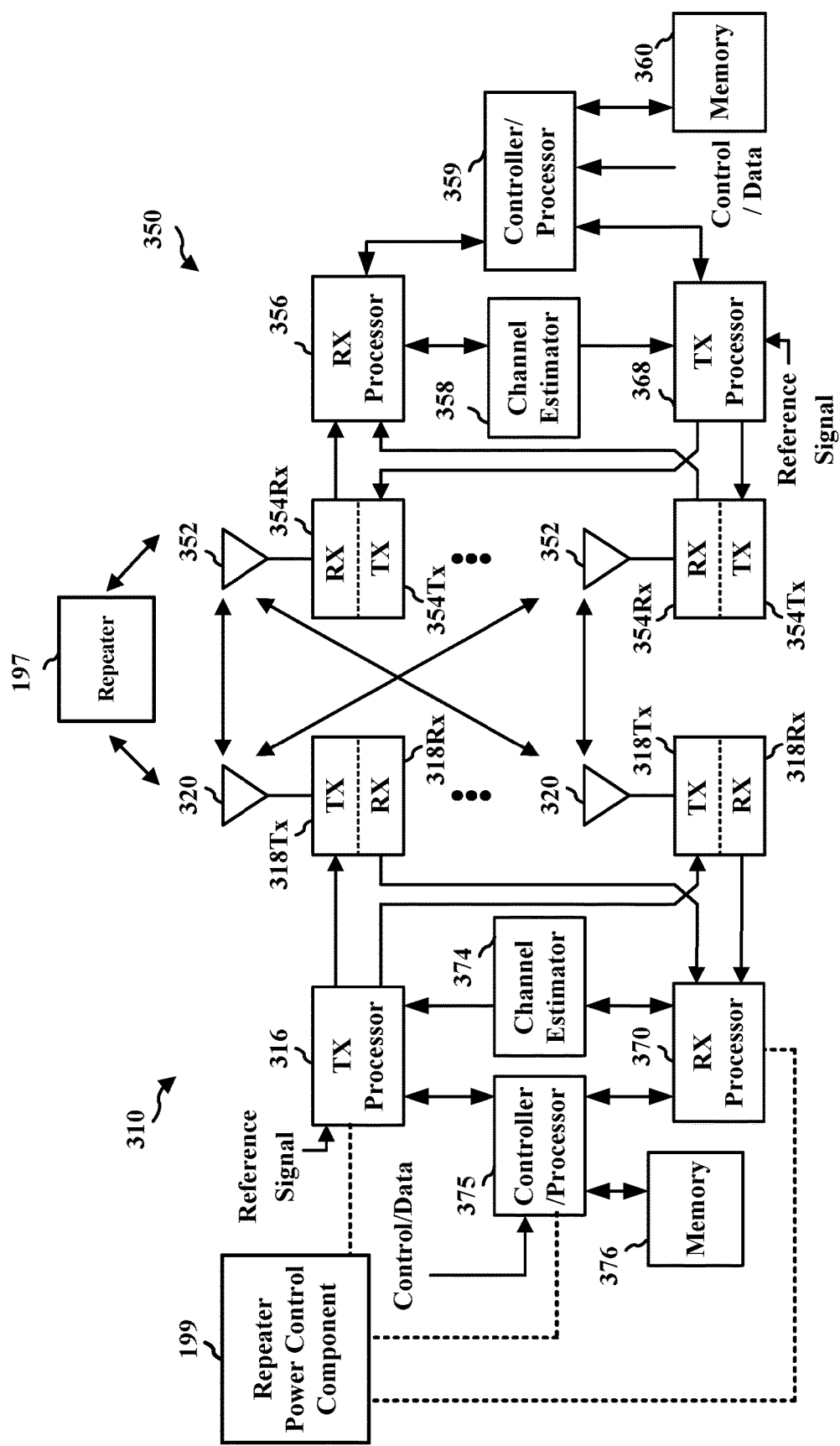
FIG. 3 is a diagram illustrating an example of a base station and UE in an access network.

In some aspects, a base station 102 may transmit communication to one or more UEs 104 via a repeater 197 (shown in FIG. 3).

Referring again to FIG. 1, in certain aspects, the base station 102 may include a repeater power control component 199. The repeater power control component 199 may be configured to measure, for a wireless device, a power adjustment between a set of resource allocations from a first time instance to a second time instance, where the set of resource allocations is associated with communication between the network node and a UE via the wireless device; and transmit, for the wireless device, an indication of the power adjustment between the set of resource allocations from the first time instance to the second time instance. Although the following description may be focused on 5G NR, the concepts described herein may be applicable to other similar areas, such as LTE, LTE-A, CDMA, GSM, and other wireless technologies.

Figure 2:
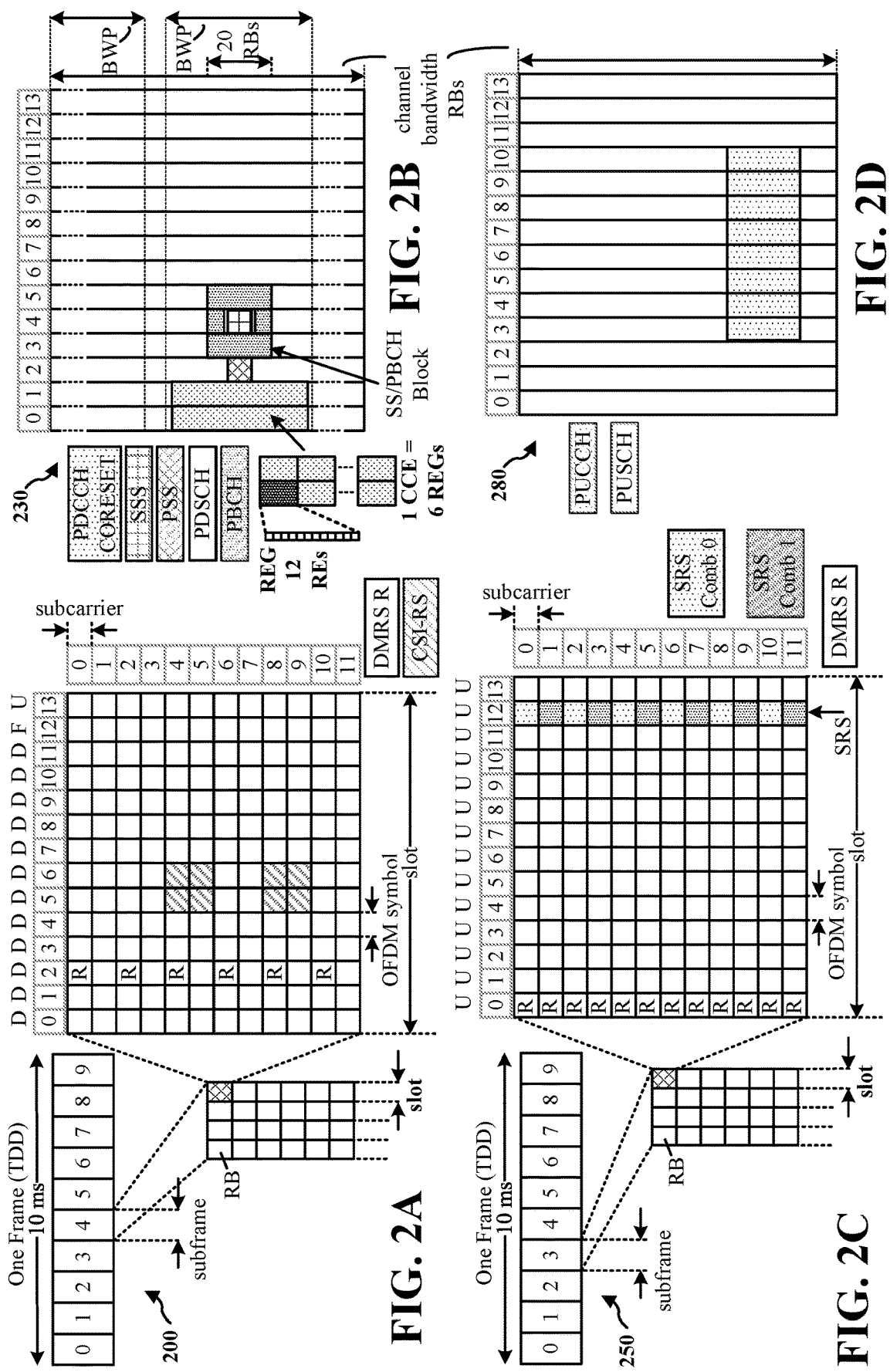
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^\mu \cdot 15[\text{kHz}]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\nu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 316, the RX processor 370, and the controller/processor 375 may be configured to perform aspects in connection with the repeater power control component 199 of FIG. 1.

Figure 4:
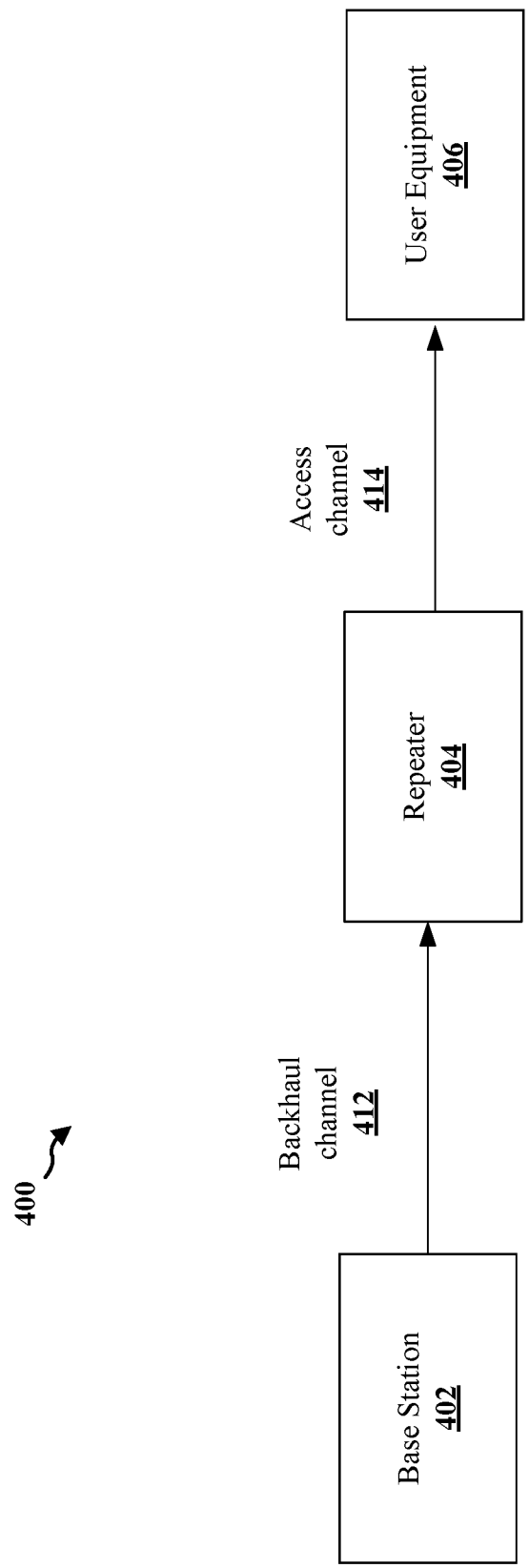
FIG. 4 is a diagram illustrating wireless communication between a base station and a UE via a repeater in an access network.

FIG. 4 is a diagram 400 illustrating wireless communication between a base station and a UE via a repeater in an access network. As shown in FIG. 4, a base station 402 may communicate with a UE 406 via a repeater 404. The repeater 404 may be connected with the base station 402 through a backhaul channel (or backhaul link) 412, and connected with the UE 406 through an access channel 414. The repeater 404 may receive a signal from the base station 402 and forward (i.e., transmit) the received signal to the UE 406. The repeater 404 may include a power amplifier (PA) to amplify the received signal before forwarding the received signal to the UE 406. The repeater 404 may be used to extend the coverage area of the base station 402. Additionally, in a multi-hop wireless network, multiple repeaters 404 may be deployed to consecutively amplify and forward the transmitted signal between the base station 402 and the UE 406. In this disclosure, the term "hop" may refer to an intermediate stage between the source and the destination that relays the signal transmitted between the source and the destination. Hence, a "multi-hop wireless network" may refer to a wireless network that includes multiple intermediate stations that consecutively relay the signal from the source to the destination. Each hop in the multi-hop wireless network may have an associated repeater for amplifying and forwarding the transmitted signal.

In wireless communications, such as the communication shown in FIG. 4, the link budget (LB) of the link in which a repeater 404 is deployed may be determined by the access channel 414. Beyond the LB optimization of the access channel, the power efficiency may be represented by power consumption utilization of a specific hop, as some of the hops may not be connected to the grid. For example, some of the repeaters 404 may be powered by renewable energy sources.

To prevent the PA from reaching the saturation point and entering the non-linear operation region, in which the transmit signals may suffer severe interference, the PA may be operating at a power level below the saturation point to ensure that the PA continuously works in the linear region, or a substantially linear region, even if there is a slight increase in the input power. The amount of power level reduced from the saturation point may be referred to as the power backoff (BO), or backoff (BO), of a PA. The power BO may correspond to a ratio between the maximum power that the PA can emit (i.e., the maximum emitted power of the PA) and the signal power level for the PA.

Since a repeater 404's PA efficiency is determined by the power BO of the PA, the PA's power BO at the repeater may have a direct impact on the LB of the link. Therefore, optimization of the PA's efficiency may play a significant role in the deployment efficiency.

The optimization of the PA's power efficiency at the repeater, however, remains a challenging task. One of the reasons is the dynamic resource allocation in DL transmission. In DL transmission, the resource allocation may vary from slot to slot, or even from symbol to symbol. In this disclosure, the term "resource allocation" may refer to the allocation of time domain and frequency domain resources for transmitting a signal to a UE. For example, resource allocation may include allocating certain symbols (time domain resource) and certain RBs (frequency domain resource) for transmitting a signal to a UE.

Since the power per RE typically remains constant, the total power that the PA of the repeater may be changing. As it is challenging to perform fast enough power tracking on a symbol level, or even a slot level, the PA's power BO at the repeater may be set to accommodate for the highest possible power. However, under this power BO setting, the PA's efficiency at the repeater may be poor in most cases (e.g., when the power is not at the maximum).

Additionally, since a repeater may serve more than one BS at the same time, the dynamic allocation issue may become more severe when each of the multiple BSs has its own allocation.

Figure 5:
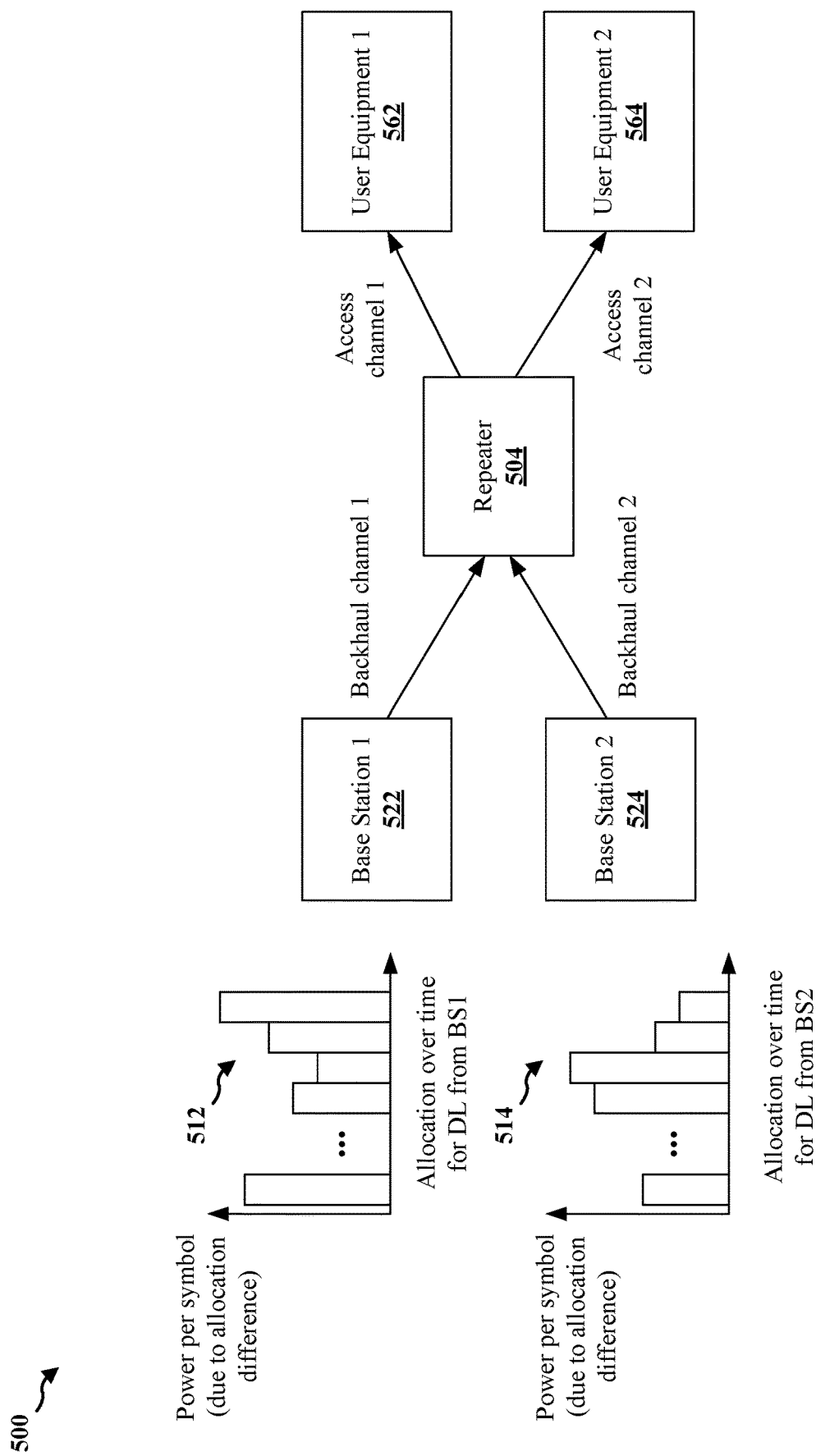
FIG. 5 is a diagram illustrating resource allocations of wireless communication from multiple base stations through a repeater in an access network.

FIG. 5 is a diagram 500 illustrating resource allocations of wireless communication from multiple BSs through a repeater in an access network. In FIG. 5, base station 1 (522) may communicate, through the repeater 504, with user equipment 1 (562), and base station 2 (524) may communicate, through the repeater 504, to user equipment 2 (564). As shown in FIG. 5, two base stations (base stations 1 and base station 2) may use the same repeater 504 to communicate with the respective UE. These two base stations may each have its own resource allocation (resource allocation 512, resource allocation 514). Hence, the power BO of the repeater 504's PA may be set to accommodate for the highest possible power from both the base station 1 (522) and the base station 2 (524), which may reduce the power efficiency of the PA of the repeater 504.

This disclosure presents power adjustment signaling methods for repeaters that address these issues. Some aspects of the present disclosure may be performed by a network node. The network node may be the base station 102, or a component of a base station, in the access network of FIG. 1 or the network entity 1202 in FIG. 12. The signaling methods described herein may include measuring, for a wireless device, a power adjustment between a set of resource allocations from a first time instance to a second time instance, where the set of resource allocations is associated with wireless communication between the network node and a UE via the wireless device; and transmitting, for the wireless device, an indication of the power adjustment between the set of resource allocations from the first time instance to the second time instance. Some aspects of the present disclosure may be performed by a wireless device. The wireless device may be a controller that is coupled with a repeater. In some aspects, the controller may be integrated into the corresponding repeater and become a component of the repeater. In that case, the signaling methods described herein may be performed by the repeater that has integrated the functionality of the controller. The signaling methods may include receiving an indication of a power adjustment between a set of resource allocations from a first time instance to a second time instance, where the set of resource allocations is associated with wireless communication between a network node and a UE via the wireless device; and adjust a power BO of the wireless device based on the indication of the power adjustment between the set of resource allocations. The methods may provide power adjustment signaling to the wireless device to enable dynamic adjustment of the power BO of the wireless device based on the resource allocation of incoming signals. Thus, the signaling methods may improve the energy efficiency of the wireless device.

Figure 6:
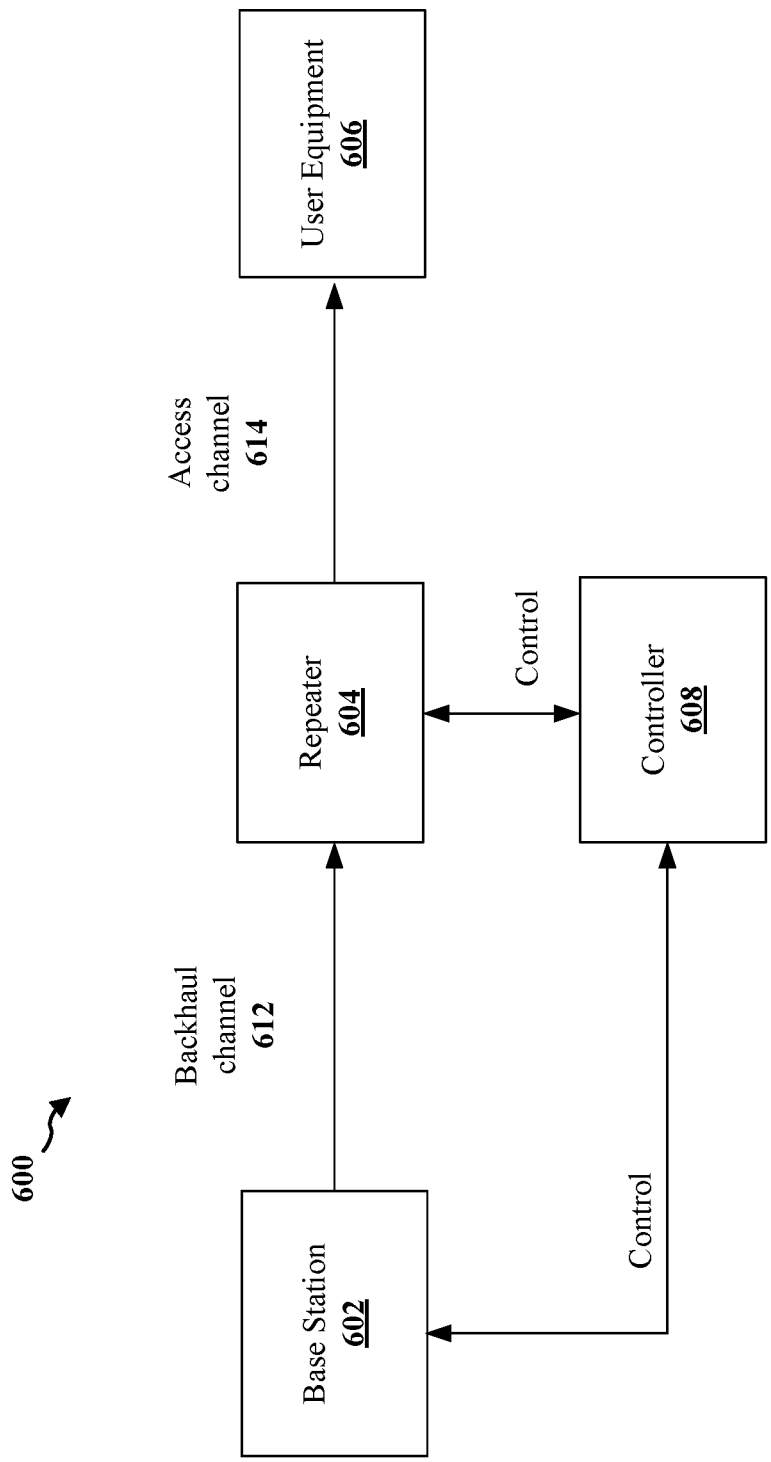
FIG. 6 is a diagram illustrating methods of wireless communication at a wireless device in accordance with various aspects of the present disclosure.

FIG. 6 is a diagram 600 illustrating methods of wireless communication at a wireless device in accordance with various aspects of the present disclosure. As shown in FIG. 6, a base station 602 may communicate with a UE 606 via a repeater 604. The repeater 604 may be connected with the base station 602 through a backhaul channel 612, and connected with the UE 606 through an access channel 614. The repeater 604 may be coupled by a controller 608 for controlling the repeater 604. The controller 608 may control the operation of the repeater 604, make measurements on the operating parameters, and communicate with the base station 602 or other entities in the access network. The controller 608 may be any device that is capable of performing these functionalities. In one example, the controller 608 may be a UE or a component of a UE. In one configuration, the controller 608 may be integrated into the repeater 604 and become a component of the repeater 604.

As shown in FIG. 6, for a BS that is using a repeater (or multiple repeaters in multi-hop case) for transmission, the BS may signal the power adjustment between the allocations. For example, as shown in FIG. 6, the base station 602 may signal the power adjustment between two allocations. The signaling may be provided enough time in advance by the base station 602 to the controller 608, so that the controller 608 may be able to read the signaling and prepare the relevant control for the repeater 604. The controller 608 may be able to control the power BO of the repeater 604 based on earlier allocations, on which measurements may be performed for automatic gain control (AGC) convergence. In one example, the controller 608 may control the power BO of the repeater 604 by adjusting the low noise amplifier (LNA) of the repeater 604. In one example, the base station 602 may signal to the repeater 604 (or multiple repeaters in multi-hop case) one single slot in advance the power adjustment in the next allocation that may be different than the last allocation for which such report was signaled. The signaling may also include the duration (i.e., for how many symbols) that the power adjustment is relevant.

Figure 7:
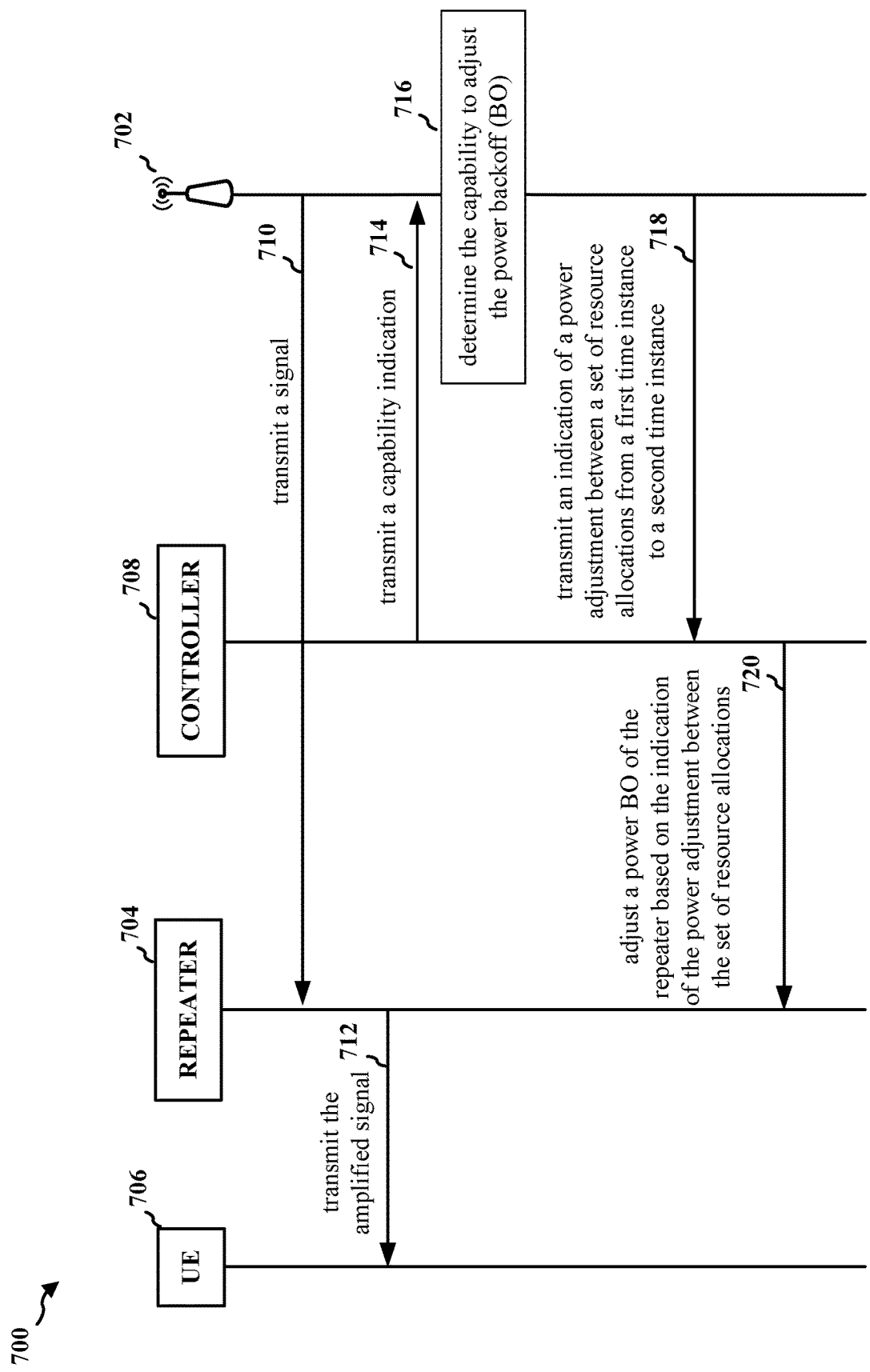
FIG. 7 is a call flow diagram illustrating methods of wireless communication in accordance with various aspects of the present disclosure.

FIG. 7 is a call flow diagram 700 illustrating methods of wireless communication in accordance with various aspects of the present disclosure. As shown in FIG. 7, at 710, a base station 702 may transmit a signal to a repeater 704. The repeater 704 may amplify the signal and, at 712, transmit the amplified signal to a UE 706. The repeater 704 may have a controller 708 coupled to the repeater 704. The base station 702 may be the base station 102 or a component of a base station, in the access network of FIG. 1 or the network entity 1202 in the hardware implementation of FIG. 12. In some aspects, at 714, the controller 708 may transmit a capability indication to the base station 702. The capability indication may indicate the capability of the repeater 704 to adjust its power BO. In some aspects, the base station may determine, at 716, the capability of the repeater 704 to adjust its power BO based on the capability indication received from the controller 708. At 718, the base station 702 may transmit an indication of a power adjustment between a set of resource allocations from the first time instance to the second time instance to the controller 708. The set of resource allocations may be associated with the signal transmitted between the base station 702 and the UE 706 via the repeater 704 (e.g., the signal transmitted at 710). In some aspects, the base station 702 may transmit the indication of the power adjustment if it determines, at 716, that the repeater 704 has the capability to adjust the power BO. At 720, the controller 708 may adjust the power BO of the repeater 704 based on the indication of the power adjustment between the set of resource allocations.

In some aspects, each time the allocation is to be updated, the base station 702 may signal (via, for example, PDCCH or a medium access control (MAC) control element (MAC-CE)) to the controller 708. The signal may include the amount of the power adjustment (in dB) compared to previously known reporting, and the duration (in terms of symbols/slots) the power adjustment is relevant. When multiple repeaters are used (e.g., in multi-hop cases), the signaling may be provided for all the repeaters/hops in the link.

In some aspects, the controller 708 or the repeater 704 may not support dynamic BO control. In this case, step 718 in FIG. 7 may not be performed. Hence, to prevent wasting resource, the repeater 704 or the controller 708 may signal (via, for example, MAC-CE or RRC) to the network (e.g., to the base station 702) to indicate whether step 718 is to be utilized.

In some aspects, the controller 708 may receive signaling from the base station 702 (at 718), and adjust, at 720, the power BO of the repeater 704 accordingly. The adjustment to the power BO may be performed by adjusting the transmit power (i.e., the signal power level) for the PA or by adjusting the PA's maximum emitted power (i.e., the power supply to the PA) to optimize power consumption.

In some aspects, the repeater 704 may serve one than one BS, and each of the BSs may have its own resource allocation. For example, as shown in FIG. 5, the repeater 504 may serve two BSs (522, 524), and each of the BSs (522, 524) may have its own allocation (resource allocation 512, resource allocation 514). In that case, the repeater (or the controller) may combine the reporting from all the BSs, and determine the adjustment to the power BO based on the predicted power of the combined signal.

As described above, the power BO of the PA may be adjusted/optimized by either adjusting the transmit power (i.e., the signal power level) for the PA or adjusting the PA's maximum emitted power (i.e., the power supply to the PA) to achieve extra power efficiency. Since an individual controller/repeater may not be aware of the network level criteria for link optimization, the BS may provide to the controller/repeater an indicator regarding how to adjust/optimize the power BO (i.e., how to utilize the PA's extra power efficiency). That is, there may be two options for the repeater to reach the same adjusted/optimized power BO. The repeater may transmit the same total power but adjust the PA's maximum emitted power with respect to the signal power. Alternatively, the repeater may adjust the transmit power but keep the PA's maximum emitted power in the same working point.

For example, in a multi-hop communication that includes multiple repeaters between the BS and the UE, when a hop is not the last hop in the multi-hop link (and hence the repeater associated with this hop is not the last repeater), the SNR may be expected to be high (i.e., a backhaul channel's SNR is high in a typical deployment). In this case, it may be more optimal to utilize the PA's extra power efficiency for power savings (especially when the repeater is powered by a green energy source and is limited by power supply). That is, for a repeater that is not the last repeater in the multi-hop link, the power BO adjustment of the repeater may be performed by transmitting the same total power but adjusting the PA's maximum emitted power with respect to the signal power. On the other hand, for a repeater in the last hop in a multi-hop link, the SNR may be expected to be low (i.e., the access channel's SNR is not high in a typical deployment). In this case, it may be more optimal to utilize the PA's extra power efficiency to transmit extra power for range extension or an increase in modulation.

In some aspects, the network (e.g., the BS) may signal (via, e.g., MAC-CE or RRC) to each controller/repeater in the multi-hop link regarding the configuration of each hop (e.g., regarding the options to adjust the power BO).

Figure 8:
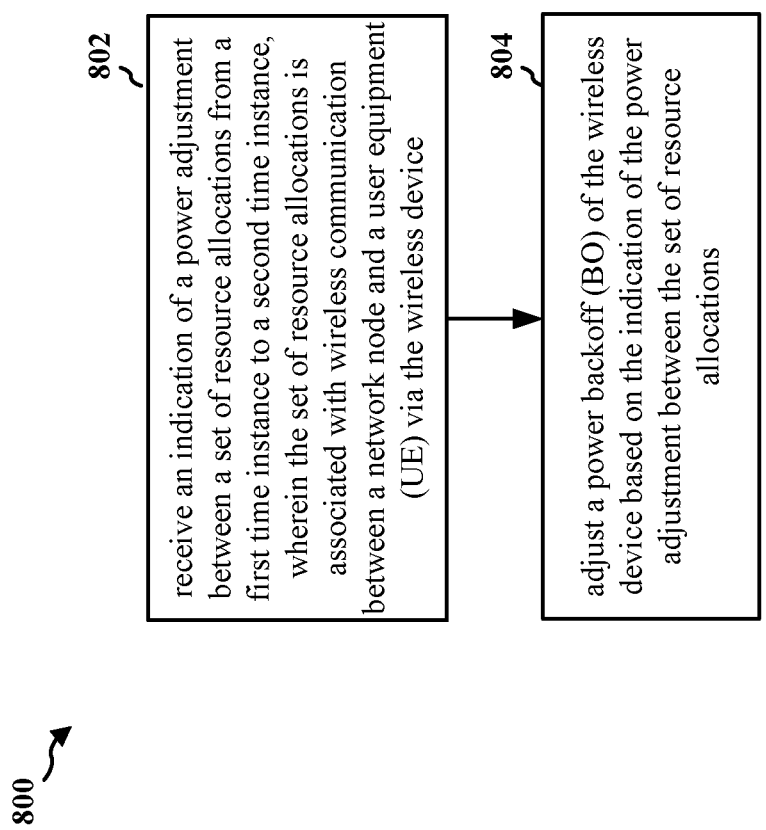
FIG. 8 is a flowchart illustrating methods of wireless communication at a wireless device in accordance with various aspects of the present disclosure.

FIG. 8 is a flowchart 800 illustrating methods of wireless communication at a wireless device in accordance with various aspects of the present disclosure. The methods may be performed by a wireless device. The methods provide power adjustment signaling to the wireless device to enable dynamic adjustment of the power BO of the wireless device based on the resource allocation of incoming signals. Thus, the methods improve the energy efficiency of the wireless device.

As shown in FIG. 8, at 802, the wireless device may receive an indication of a power adjustment between a set of resource allocations from the first time instance to the second time instance. The set of resource allocations may be associated with wireless communication between a network node and a UE via the wireless device. In some aspects, the wireless device may be a controller that is coupled with a repeater. The controller may be the controller 608, 708, and the repeater may be repeater 604, 704. In some aspects, the controller may be integrated into the corresponding repeater and become a component of the repeater. For example, the controller 608 may be integrated into the repeater 604 and become a component of the repeater 604, and the controller 708 may be integrated into the repeater 704 and become a component of the repeater 704. In those cases, the methods may be performed by the repeater that has integrated the functionality of the controller. The network node may be a base station, or a component of a base station, in the access network of FIG. 1 or a core network component (e.g., base station 102, 310; CU 110; DU 130; RU 140; the base station 402, 522, 524, 602, 702; or the network entity 1202 in the hardware implementation of FIG. 12). The repeater may be the repeater 604, 704. The repeater may be configured to amplify a signal received from the BS, and transmit the amplified signal to a UE. The UE may be the UE 104, 350, 406, 562, 564, 606, 706, or the apparatus 1204 in the hardware implementation of FIG. 12. FIG. 6 illustrates various aspects of a network node transmitting a signal to a repeater. As shown in FIG. 6, in one configuration, the network node (e.g., base station 602) may transmit, at 612, a signal to the wireless device (e.g., repeater 604). The repeater 604 may be configured to amplify the signal and transmit the amplified signal to a UE 606. FIG. 7 illustrates various aspects of a wireless device receiving an indication of a power adjustment between a set of resource allocations from the first time instance to the second time instance. For example, at 718, a wireless device (controller 708) may receive an indication of a power adjustment between a set of resource allocations at the first time instance to the second time instance.

At 804, a power BO of the wireless device may be adjusted based on the indication of the power adjustment between the set of resource allocations. For example, at 720, a power BO of the wireless device may be adjusted based on an indication of the power adjustment between the set of resource allocations.

Figure 9:
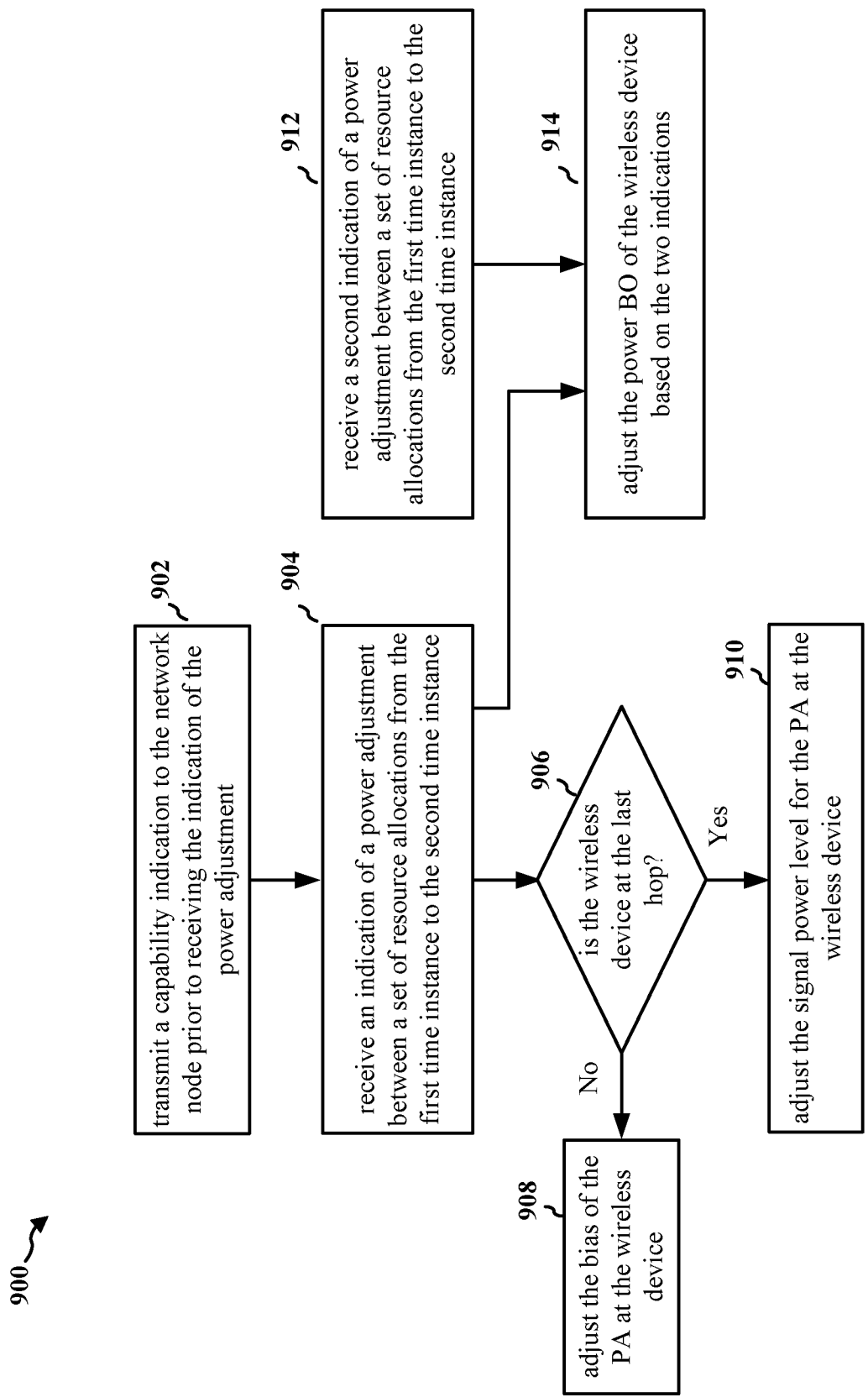
FIG. 9 is a flowchart illustrating methods of wireless communication at a wireless device in accordance with various aspects of the present disclosure.

FIG. 9 is a flowchart 900 illustrating methods of wireless communication at a wireless device in accordance with various aspects of the present disclosure. The methods may be performed by a wireless device. The methods provide power adjustment signaling to the wireless device to enable dynamic adjustment of the power BO of the wireless device based on the resource allocation of incoming signals. Hence, the methods improve the energy efficiency of the wireless device.

As shown in FIG. 9, at 904, the wireless device may receive an indication of a power adjustment between a set of resource allocations from the first time instance to the second time instance. The set of resource allocations may be associated with wireless communication between a network node and a UE via the wireless device. Step 904 may be the same as step 802 in flowchart 800. Relevant description in connection with flowchart 800 may be referred to for details of step 904, which are not repeatedly described here for the sake of conciseness. For example, at 718, a wireless device (controller 708) may receive an indication of a power adjustment between a set of resource allocations at the first time instance to the second time instance.

In some aspects, the wireless communication between the network node and the UE may be a multi-hop communication including a plurality of hops. In that case, the adjustment of the power BO of the wireless device may be done by adjusting the maximum emitted power of the PA at the wireless device or adjusting the signal power level for the PA at the wireless device, depending on the location of the wireless device in the plurality of hops.

As shown in FIG. 9, at 906, the location of the wireless device in the plurality of the hops may be determined. The determination may be performed by the network node. If it is determined that the wireless device is not at the last hop of the plurality of hops, the adjustment of the power BO of the wireless device may be done by, at 908, adjusting the maximum emitted power of the PA at the wireless device. On the other hand, if it is determined that that wireless device is at the last hop of the plurality of hops, the adjustment of the power BO of the wireless device may be done by, at 910, adjusting the signal power level for the PA at the wireless device.

For example, at 720, a controller 708 may adjust the power BO of a wireless device (repeater 704). If it is determined that the wireless device is not at the last hop of the plurality of hops, the controller 708 may adjust the power BO of the wireless device by adjusting the maximum emitted power of the PA at the wireless device. On the other hand, if it is determined that the wireless device is at the last hop of the plurality of hops, the controller 708 may adjust the power BO of the wireless device by adjusting the signal power level for the PA at the wireless device.

In some aspects, adjusting the maximum emitted power of the PA may correspond to the first adjustment to the power consumption of the wireless device, and adjusting the signal power level of the PA may correspond to the second adjustment to a link budget of an access channel or a backhaul channel.

In some aspects, the set of resource allocations may be a set of consecutive resource allocations or a set of non-consecutive resource allocations. The power adjustment may be the difference in power between the set of resource allocations at the first time instance compared to the second time instance.

In some aspects, the set of resource allocations may be a set of slots or a set of symbols. The power adjustment may be associated with (1) a change in power for the set of slots or the set of symbols from the first time instance to the second time instance, and (2) a number of slots or symbols to which the power adjustment is applied.

In some aspects, receiving the indication of power adjustment between the set of resource allocations from the first time instance to the second time instance may include: receiving, at one slot or one symbol prior to the second time instance, the indication of the power adjustment between the set of resource allocations from the first time instance to the second time instance.

Referring to FIG. 9, in some aspects, the wireless device may, at 902, transmit a capability indication to the network node prior to receiving the indication of the power adjustment. The capability indication may indicate the capability of the wireless device to adjust the power BO of the wireless device. For example, at 714, a wireless device (a combination of repeater 704 and controller 708) may transmit a capability indication to the base station 702 before receiving the indication of the power adjustment from the base stations 702. The capability indication may indicate the capability of the wireless device to adjust the power BO.

Referring to FIG. 9, in some aspects, the indication of the power adjustment the wireless received may be referred to as the first indication of the power adjustment, the network node may be referred to as the first network node, which is associated with a plurality of network nodes. Other than the first indication, the wireless device may, at 912, receive a second indication of the power adjustment between a second set of resource allocations from the first time instance to the second time instance. The second set of resource allocations may be associated with second wireless communication between a second network node and the wireless device.

At 914, the wireless device may adjust the power BO of the wireless device based on the first indication and the second indication. For example, at 720, the wireless device (a combination of repeater 704 and controller 708) may adjust its power BO based on the first indication and the second indication.

In some aspects, the indication may be received from the network node, and the wireless device may be at least one repeater, at least one repeating device, or at least one controller. For example, the repeater or the repeating device may be repeater 604, 704, the controller may be controller 608, 708, as shown in FIGS. 6 and 7.

In some aspects, the indication may be received by the wireless device via a physical downlink control channel (PDCCH) or a medium access control (MAC) control element (MAC-CE).

Figure 10:
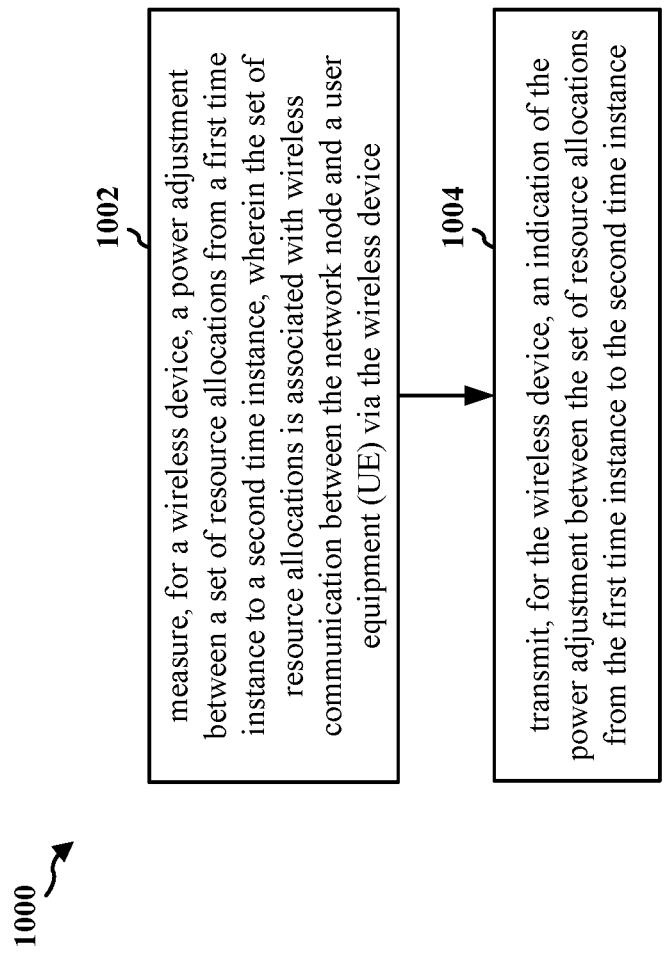
FIG. 10 is a flowchart illustrating methods of wireless communication at a network node in accordance with various aspects of the present disclosure.

FIG. 10 is a flowchart 1000 illustrating methods of wireless communication at a network node in accordance with various aspects of the present disclosure. The methods may be performed by a network node. The network node may be a base station, or a component of a base station, in the access network of FIG. 1 or a core network component (e.g., base station 102, 310; CU 110; DU 130; RU 140; base station 402, 522, 524, 602, 702; or the network entity 1202 in the hardware implementation of FIG. 12). The methods provide power adjustment signaling to the wireless device to enable dynamic adjustment of the power BO of the wireless device based on the resource allocation of incoming signals. Hence, the methods improve the energy efficiency of the wireless device.

As shown in FIG. 10, at 1002, the network node may measure, for a wireless device, a power adjustment between a set of resource allocations from the first time instance to the second time instance. The set of resource allocations may be associated with wireless communication between the network node and a UE via the wireless device. In some aspects, the wireless device may be a controller that is coupled with a repeater. The controller may be controller 608, 708, and the repeater may be repeater 604, 704. In some aspects, the controller may be integrated into the corresponding repeater and become a component of the repeater. For example, the controller 608 may be integrated into the repeater 604 and become a component of the repeater 604, and the controller 708 may be integrated into the repeater 704 and become a component of the repeater 704. The repeater may be configured to amplify a signal received from the BS, and transmit the amplified signal to a UE. The UE may be the UE 104, 350, 406, 562, 564, 606, 706, or the apparatus 1204 in the hardware implementation of FIG. 12.

At 1004, the network node may transmit, for the wireless device, an indication of the power adjustment between the set of resource allocations from the first time instance to the second time instance. FIG. 6 illustrates various aspects of a network node transmitting a signal to a repeater. As shown in FIG. 6, in one configuration, the network node (e.g., base station 602) may transmit, through backhaul channel 612, a signal to the wireless device (e.g., repeater 604). The repeater 604 may be configured to amplify the signal and transmit the amplified signal to a UE 606. FIG. 7 illustrates various aspects of a network node transmitting an indication of a power adjustment between a set of resource allocations from a first time instance to a second time instance. For example, at 718, the base station 702 may transmit an indication of a power adjustment between a set of resource allocations at the first time instance to a second time instance to the controller 708.

In some aspects, the power adjustment may be associated with an adjustment in the power BO of the wireless device.

In some aspects, the wireless communication between the network node and the UE may be a multi-hop communication including a plurality of hops, and the adjustment in the power BO of the wireless device may correspond to an adjustment to the maximum emitted power of a PA at the wireless device, or the signal power level for the PA at the wireless device based on a location of the wireless device in the plurality of hops.

In some aspects, the adjustment in the power BO of the wireless device may correspond to an adjustment to the maximum emitted power of the PA at the wireless device if the wireless device is not at the last hop of the plurality of hops.

In some aspects, the adjustment in the power BO of the wireless device may correspond to an adjustment to the signal power level for the PA at the wireless device if the wireless device is at the last hop of the plurality of hops.

In some aspects, the power BO of the wireless device may correspond to a ratio between the maximum emitted power of the PA at the wireless device and the signal power level for the PA of the wireless device.

In some aspects, the network node and the UE may communicate via a plurality of wireless devices. In that case, steps 1002 and 1004 may be performed on each wireless device of the plurality of wireless devices. That is, the aforementioned method may further include: measuring, for each corresponding wireless device of a plurality of wireless devices, a corresponding power adjustment between a corresponding set of resource allocations from the first time instance to the second time instance, where each of the plurality of wireless devices corresponds to a hop in the plurality of hops, and where the set of resource allocations is associated with wireless communication between the network node and the UE via the corresponding wireless device; and transmitting, to each wireless device of the plurality of wireless devices, an indication of the corresponding power adjustment between the set of resource allocations from the first time instance to the second time instance.

In some aspects, the adjustment to the maximum emitted power of the PA may correspond to the first adjustment in the power consumption of the wireless device, and the adjustment to the signal power level for the PA may correspond to the second adjustment in a link budget of an access channel or a backhaul channel.

In some aspects, the set of resource allocations may be a set of consecutive resource allocations or a set of non-consecutive resource allocations, and the power adjustment may be the difference in power between the set of resource allocations at the first time instance compared to the second time instance.

In some aspects, the set of resource allocations may be a set of slots or a set of symbols. The power adjustment may be associated with: (1) a change in power for the set of slots or the set of symbols from the first time instance to the second time instance; and (2) a number of slots or symbols to which the power adjustment is applied.

In some aspects, transmitting the indication of the power adjustment between the set of resource allocations from the first time instance to the second time instance may include: transmitting, at one slot or symbol prior to the second time instance, the indication of the power adjustment between the set of resource allocations from the first time instance to the second time instance.

In some aspects, the wireless device may be at least one repeater, at least one repeating device, or at least one controller.

In some aspects, the indication may be transmitted via a PDCCH or a MAC-CE.

Figure 11:
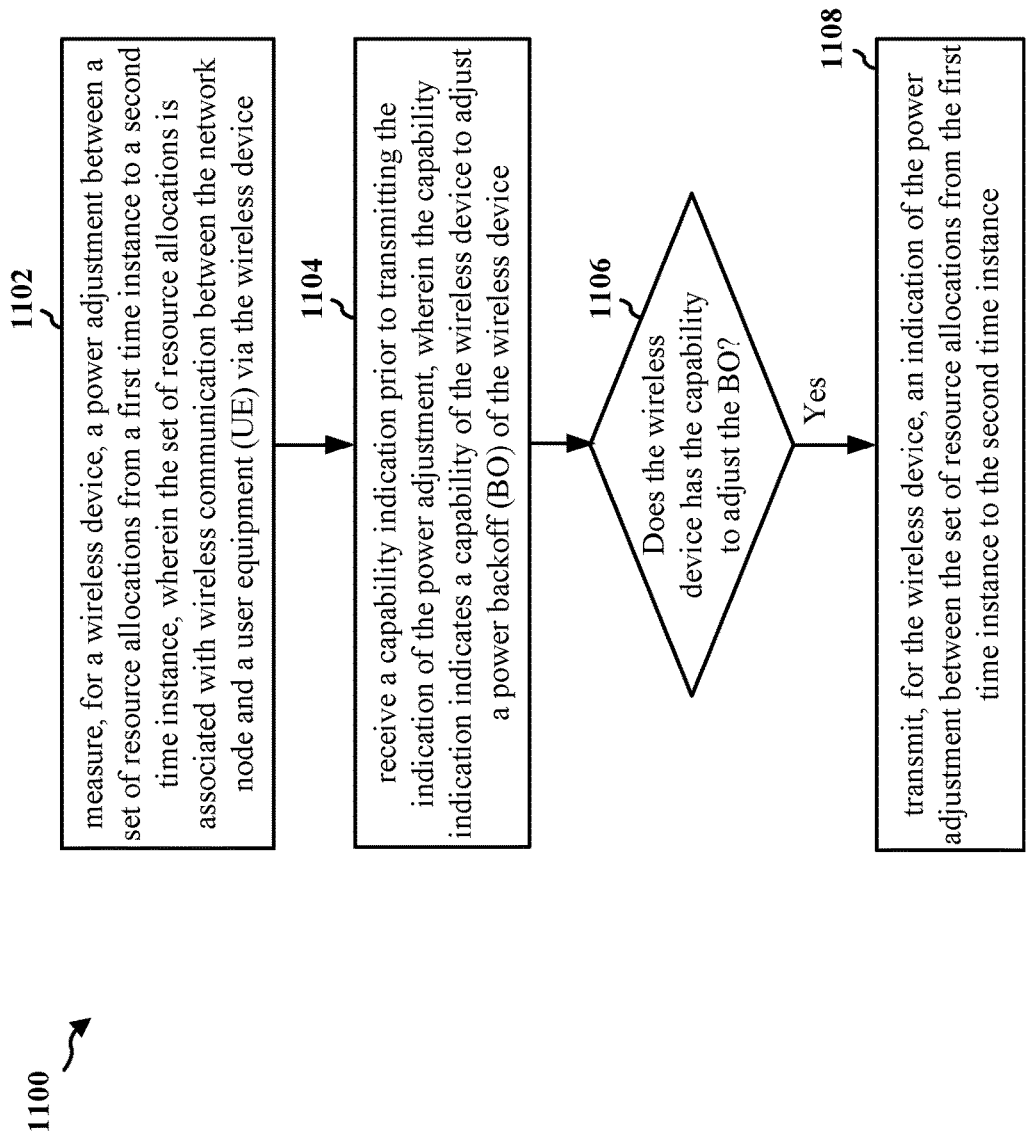
FIG. 11 is a flowchart illustrating methods of wireless communication at a network node in accordance with various aspects of the present disclosure.

FIG. 11 is a flowchart 1100 illustrating methods of wireless communication at a network node in accordance with various aspects of the present disclosure. The methods may be performed by a network node. The network node may be the base station 102, or a component of a base station, in the access network of FIG. 1 or the network entity 1202 in FIG. 12. In flowchart 1100, steps 1102 and 1108 are the same as, respectively, steps 1002 and 1004 in flowchart 1000. Relevant description in connection with flowchart 1000 may be referred to for details of these steps, which are not repeatedly presented here for the sake of conciseness. As shown in FIG. 11, at 1104, the network node may receive a capability indication prior to transmitting the indication of the power adjustment. The capability indication may indicate the capability of the wireless device to adjust a power BO of the wireless device. For example, at 714, the network node (base station 702) may receive a capability indication prior to transmitting the indication of the power adjustment. The capability indication may indicate the capability of the wireless device (a combination of repeater 704 and controller 708) to adjust its power BO.

At 1106, the network node may determine whether the wireless device has the capability to adjust the power BO based on the capability indication. For example, at 716, the network node (base station 702) may determine, based on the capability indication, whether the wireless device (a combination of repeater 704 and controller 708) has the capability to adjust its power BO. Then, the network node will, at 1108, transmit the indication of the power adjustment if it is determined that the wireless device has the capability to adjust the power BO. For example, at 718, the network node (base station 702) may transmit the indication of the power adjustment to the wireless device if the network node determines that the wireless device has the capability to adjust the power BO.

Figure 12:
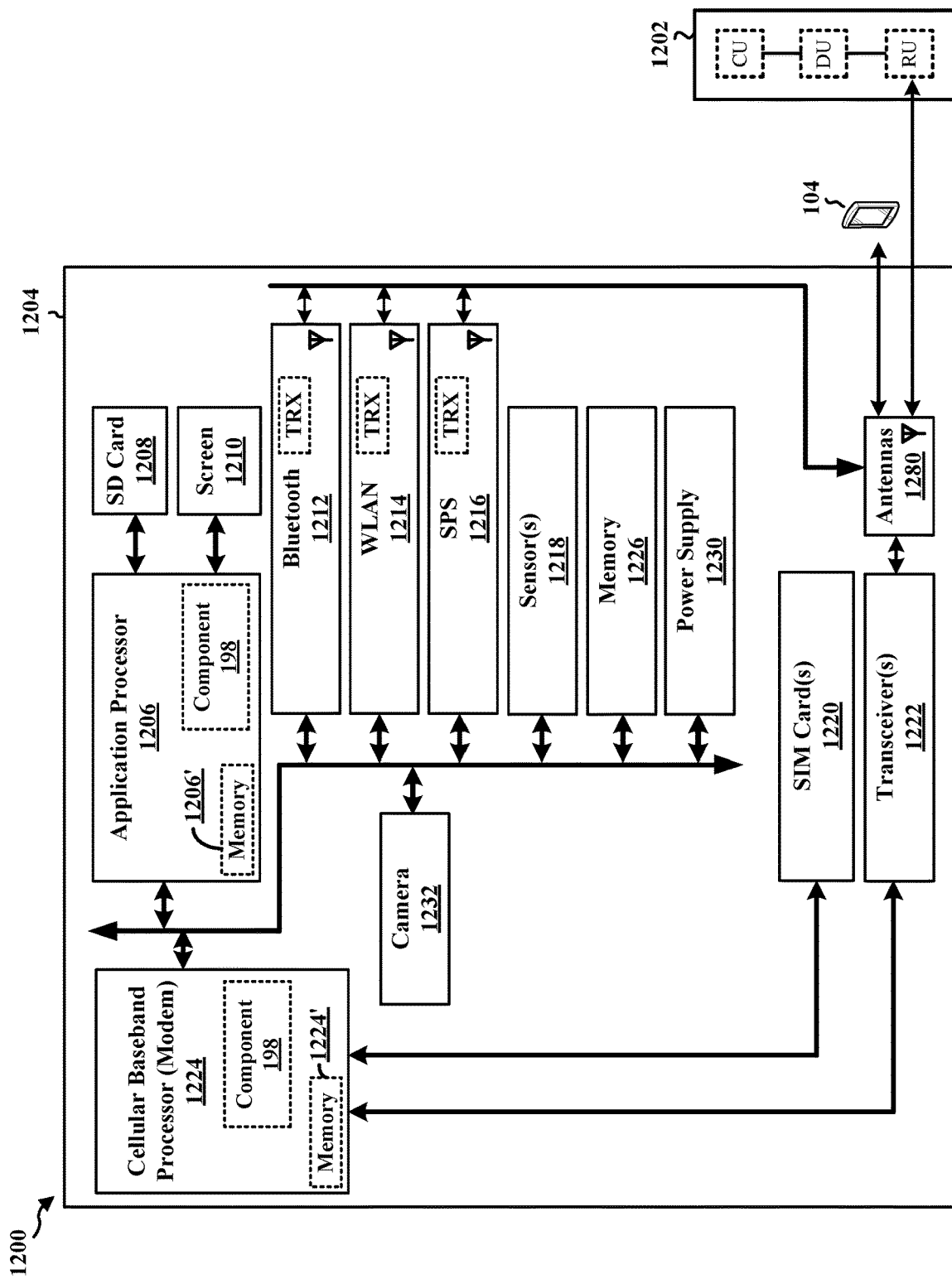
FIG. 12 is a diagram illustrating an example of a hardware implementation for an example apparatus and/or network entity.

FIG. 12 is a diagram 1200 illustrating an example of a hardware implementation for an apparatus 1204. The apparatus 1204 may be a UE, a component of a UE, or may implement UE functionality. In some aspects, the apparatus 1204 may include a cellular baseband processor 1224 (also referred to as a modem) coupled to one or more transceivers 1222 (e.g., cellular RF transceiver). The cellular baseband processor 1224 may include on-chip memory 1224'. In some aspects, the apparatus 1204 may further include one or more subscriber identity modules (SIM) cards 1220 and an application processor 1206 coupled to a secure digital (SD) card 1208 and a screen 1210. The application processor 1206 may include on-chip memory 1206'. In some aspects, the apparatus 1204 may further include a Bluetooth module 1212, a WLAN module 1214, an SPS module 1216 (e.g., GNSS module), one or more sensor modules 1218 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1226, a power supply 1230, and/or a camera 1232. The Bluetooth module 1212, the WLAN module 1214, and the SPS module 1216 may include an on-chip transceiver (TRX) (or in some cases, just a receiver (RX)). The Bluetooth module 1212, the WLAN module 1214, and the SPS module 1216 may include their own dedicated antennas and/or utilize the antennas 1280 for communication. The cellular baseband processor 1224 communicates through the transceiver(s) 1222 via one or more antennas 1280 with the UE 104 and/or with an RU associated with a network entity 1202. The cellular baseband processor 1224 and the application processor 1206 may each include a computer-readable medium/memory 1224', 1206', respectively. The additional memory modules 1226 may also be considered a computer-readable medium/memory. Each computer-readable medium/memory 1224', 1206', 1226 may be non-transitory. The cellular baseband processor 1224 and the application processor 1206 are each responsible for general processing, including the execution of software stored on the computer-readable medium/memory. The software, when executed by the cellular baseband processor 1224/application processor 1206, causes the cellular baseband processor 1224/application processor 1206 to perform the various functions described supra. The computer-readable medium/memory may also be used for storing data that is manipulated by the cellular baseband processor 1224/application processor 1206 when executing software. The cellular baseband processor 1224/application processor 1206 may be a component of the UE 350 and may include the memory 360 and/or at least one of the TX processor 368, the RX processor 356, and the controller/processor 359. In one configuration, the apparatus 1204 may be a processor chip (modem and/or application) and include just the cellular baseband processor 1224 and/or the application processor 1206, and in another configuration, the apparatus 1204 may be the entire UE (e.g., see 350 of FIG. 3) and include the additional modules of the apparatus 1204.

Figure 13:
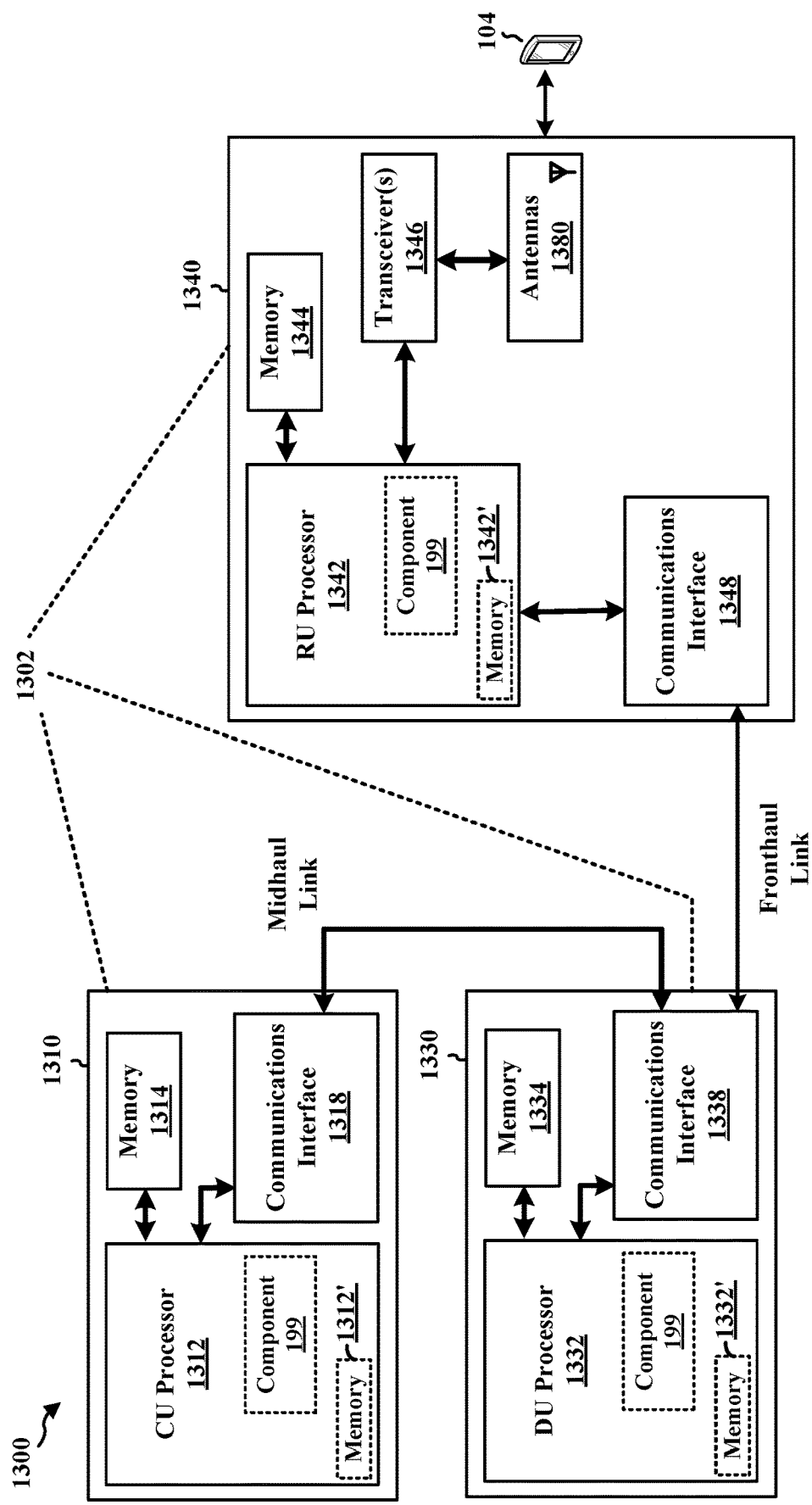
FIG. 13 is a diagram illustrating an example of a hardware implementation for an example network entity.

FIG. 13 is a diagram 1300 illustrating an example of a hardware implementation for a network entity 1302. The network entity 1302 may be a BS, a component of a BS, or may implement BS functionality. The network entity 1302 may include at least one of a CU 1310, a DU 1330, or an RU 1340. For example, depending on the layer functionality handled by the component 199, the network entity 1302 may include the CU 1310; both the CU 1310 and the DU 1330; each of the CU 1310, the DU 1330, and the RU 1340; the DU 1330; both the DU 1330 and the RU 1340; or the RU 1340. The CU 1310 may include a CU processor 1312. The CU processor 1312 may include on-chip memory 1312'. In some aspects, the CU 1310 may further include additional memory modules 1314 and a communications interface 1318. The CU 1310 communicates with the DU 1330 through a midhaul link, such as an F1 interface. The DU 1330 may include a DU processor 1332. The DU processor 1332 may include on-chip memory 1332'. In some aspects, the DU 1330 may further include additional memory modules 1334 and a communications interface 1338. The DU 1330 communicates with the RU 1340 through a fronthaul link. The RU 1340 may include an RU processor 1342. The RU processor 1342 may include on-chip memory 1342'. In some aspects, the RU 1340 may further include additional memory modules 1344, one or more transceivers 1346, antennas 1380, and a communications interface 1348. The RU 1340 communicates with the UE 104. The on-chip memory 1312', 1332', 1342' and the additional memory modules 1314, 1334, 1344 may each be considered a computer-readable medium/memory. Each computer-readable medium/memory may be non-transitory. Each of the processors 1312, 1332, 1342 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to measure, for a wireless device, a power adjustment between a set of resource allocations from a first time instance to a second time instance, where the set of resource allocations is associated with wireless communication between the network node and a UE via the wireless device; and transmit, for the wireless device, an indication of the power adjustment between the set of resource allocations from the first time instance to the second time instance. The component 199 may be further configured to perform any of the aspects described in connection with the flowcharts in FIGS. 10 and 11, and/or the aspects performed by the base station in FIG. 7. The component 199 may be within one or more processors of one or more of the CU 1310, DU 1330, and the RU 1340. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1302 may include a variety of components configured for various functions. In one configuration, the network entity 1302 includes means for measuring, for a wireless device, a power adjustment between a set of resource allocations from a first time instance to a second time instance, where the set of resource allocations is associated with wireless communication between the network node and a UE via the wireless device, and means for transmitting, for the wireless device, an indication of the power adjustment between the set of resource allocations from the first time instance to the second time instance. The network entity may further include means for performing any of the aspects described in connection with the flowcharts in FIGS. 10 and 11, and/or the aspects performed by the base station in FIG. 7. The means may be the component 199 of the network entity 1302 configured to perform the functions recited by the means. As described supra, the network entity 1302 may include the TX processor 316, the RX processor 370, and the controller/processor 375. As such, in one configuration, the means may be the TX processor 316, the RX processor 370, and/or the controller/processor 375 configured to perform the functions recited by the means.

Figure 14:
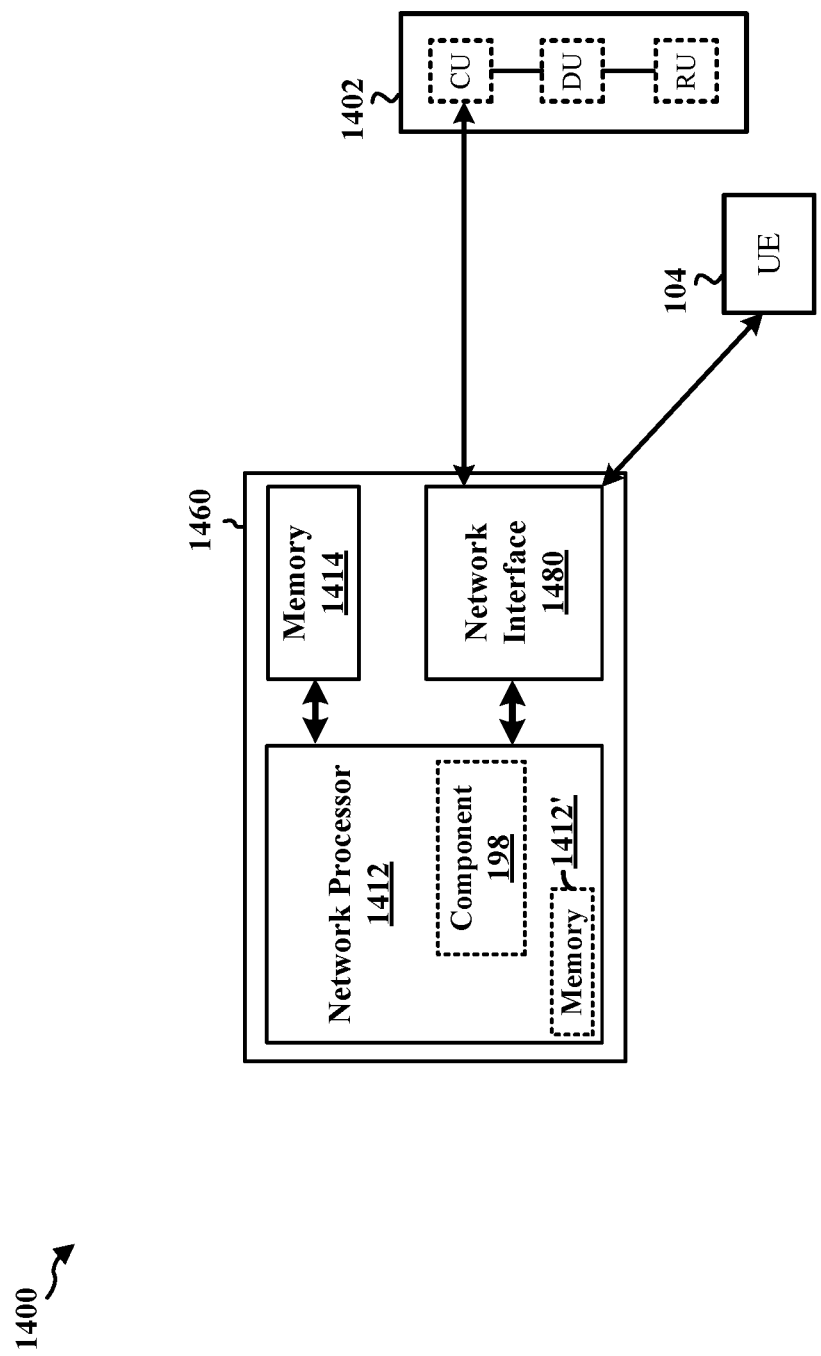
FIG. 14 is a diagram illustrating an example of a hardware implementation for an example network entity.

FIG. 14 is a diagram 1400 illustrating an example of a hardware implementation for a network entity 1460. In one example, the network entity 1460 may be within the repeater 197 (shown in FIG. 3). The network entity 1460 may include a repeater processor 1412. The repeater processor 1412 may include on-chip memory 1412'. In some aspects, the network entity 1460 may further include additional memory modules 1414. The network entity 1460 communicates via the network interface 1480 directly (e.g., backhaul link) or indirectly (e.g., through a RIC) with the CU 1402. The on-chip memory 1412' and the additional memory modules 1414 may each be considered a computer-readable medium/memory. Each computer-readable medium/memory may be non-transitory. The processor 1412 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 198 is configured to receive an indication of a power adjustment between a set of resource allocations from a first time instance to a second time instance, where the set of resource allocations is associated with wireless communication between a network node and a UE via the wireless device; and adjust a power BO of the wireless device based on the indication of the power adjustment between the set of resource allocations. The component 198 may be further configured to perform any of the aspects described in connection with the flowcharts in FIGS. 8 and 9, and/or the aspects performed by the repeater in FIG. 7. The component 198 may be within the processor 1412. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1460 may include a variety of components configured for various functions. In one configuration, the network entity 1460 includes means for receiving an indication of a power adjustment between a set of resource allocations from a first time instance to a second time instance, where the set of resource allocations is associated with wireless communication between a network node and a UE via the wireless device; and means for adjusting a power BO of the wireless device based on the indication of the power adjustment between the set of resource allocations. The network entity may further include means for performing any of the aspects described in connection with the flowcharts in FIGS. 8 and 9, and/or the aspects performed by the repeater in FIG. 7. The means may be the component 198 of the network entity 1460 configured to perform the functions recited by the means.

This disclosure provides a method of power adjustment signaling for one or more repeaters. The method may include receiving an indication of a power adjustment between a set of resource allocations from a first time instance to a second time instance, where the set of resource allocations is associated with wireless communication between a network node and a UE via a wireless device; and adjusting a power BO of the wireless device based on the indication of the power adjustment between the set of resource allocations. The method provides power adjustment signaling to the wireless device to enable dynamic adjustment of the power BO of the wireless device based on the resource allocation of incoming signals. Hence, the method improves the energy efficiency of the wireless device.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a wireless device, including: receiving an indication of a power adjustment between a set of resource allocations from a first time instance to a second time instance, where the set of resource allocations is associated with wireless communication between a network node and a UE via the wireless device; and adjusting a power BO of the wireless device based on the indication of the power adjustment between the set of resource allocations.

Aspect 2 is the method of aspect 1, where the wireless communication between the network node and the UE is a multi-hop communication including a plurality of hops, and where adjusting the power BO of the wireless device includes: adjusting, based on a location of the wireless device in the plurality of hops, the maximum emitted power of a PA at the wireless device or the signal power level for the PA at the wireless device.

Aspect 3 is the method of aspect 2, where adjusting the power BO of the wireless device includes: adjusting, in response to the wireless device not being at the last hop of the plurality of hops, the maximum emitted power of the PA at the wireless device.

Aspect 4 is the method of aspect 2, where adjusting the power BO of the wireless device includes: adjusting, in response to the wireless device being at the last hop of the plurality of hops, the signal power level for the PA at the wireless device.

Aspect 5 is the method of aspect 2, where adjusting the maximum emitted power of the PA corresponds to a first adjustment to the power consumption of the wireless device, and where adjusting the signal power level for the PA corresponds to a second adjustment to a link budget of an access channel or a backhaul channel.

Aspect 6 is the method of any of aspects 1 to 5, where the set of resource allocations is a set of consecutive resource allocations or a set of non-consecutive resource allocations, and where the power adjustment is a difference in power between the set of resource allocations at the first time instance compared to the second time instance.

Aspect 7 is the method of any of aspects 1 to 5, where the set of resource allocations is a set of slots or a set of symbols, and where the power adjustment is associated with: (1) a change in power for the set of slots or the set of symbols from the first time instance to the second time instance; and (2) a number of slots or symbols to which the power adjustment is applied.

Aspect 8 is the method of aspect 7, where receiving the indication of the power adjustment between the set of resource allocations from the first time instance to the second time instance includes: receiving, at one slot or one symbol prior to the second time instance, the indication of the power adjustment between the set of resource allocations from the first time instance to the second time instance.

Aspect 9 is the method of any of aspects 1 to 8, where the method further includes: transmitting a capability indication to the network node prior to receiving the indication of the power adjustment, where the capability indication indicates the capability of the wireless device to adjust the power BO of the wireless device.

Aspect 10 is the method of any of aspects 1 to 9, where the indication of the power adjustment is a first indication of the power adjustment, the network node is a first network node associated with a plurality of network nodes, and the method further includes: receiving a second indication of the power adjustment between a second set of resource allocations from the first time instance to the second time instance, where the second set of resource allocations is associated with second wireless communication between a second network node and the wireless device, and where adjusting the power BO of the wireless device includes: adjusting the power BO of the wireless device based on the first indication and the second indication.

Aspect 11 is the method of any of aspects 1 to 10, where the indication is received from the network node, and the wireless device is at least one repeater, at least one repeating device, or at least one controller.

Aspect 12 is the method of any of aspects 1 to 11, where the indication is received via a PDCCH or a MAC-CE.

Aspect 13 is a method of wireless communication at a network node. The method includes: measuring, for a wireless device, a power adjustment between a set of resource allocations from a first time instance to a second time instance, where the set of resource allocations is associated with wireless communication between the network node and a UE via the wireless device; and transmitting, for the wireless device, an indication of the power adjustment between the set of resource allocations from the first time instance to the second time instance.

Aspect 14 is the method of aspect 13, where the power adjustment is associated with an adjustment in the power BO of the wireless device.

Aspect 15 is the method of aspect 13, where the wireless communication between the network node and the UE is a multi-hop communication including a plurality of hops, and where the adjustment in the power BO of the wireless device corresponds to an adjustment to the maximum emitted power of a PA at the wireless device or the signal power level for the PA at the wireless device based on a location of the wireless device in the plurality of hops.

Aspect 16 is the method of aspect 15, where the adjustment in the power BO of the wireless device corresponds to an adjustment to the maximum emitted power of the PA at the wireless device if the wireless device is not at the last hop of the plurality of hops.

Aspect 17 is the method of aspect 15, where the adjustment in the power BO of the wireless device corresponds to an adjustment to the signal power level for the PA at the wireless device if the wireless device is at the last hop of the plurality of hops.

Aspect 18 is the method of aspect 15, where the power BO of the wireless device corresponds to a ratio between the maximum emitted power of the PA at the wireless device and the signal power level for the PA of the wireless device.

Aspect 19 is the method of aspect 15, where the method further includes: measuring, for each corresponding wireless device of a plurality of wireless devices, a corresponding power adjustment between a corresponding set of resource allocations from the first time instance to the second time instance, where each of the plurality of wireless devices corresponds to a hop in the plurality of hops, and where the set of resource allocations is associated with wireless communication between the network node and the UE via the corresponding wireless device; and transmitting, to each wireless device of the plurality of wireless devices, an indication of the corresponding power adjustment between the set of resource allocations from the first time instance to the second time instance.

Aspect 20 is the method of aspect 15, where the adjustment to the maximum emitted power of the PA corresponds to a first adjustment in the power consumption of the wireless device, and where the adjustment to the signal power level for the PA corresponds to a second adjustment in a link budget of an access channel or a backhaul channel.

Aspect 21 is the method of any of aspects 13 to 20, where the set of resource allocations is a set of consecutive resource allocations or a set of non-consecutive resource allocations, and where the power adjustment is a difference in power between the set of resource allocations at the first time instance compared to the second time instance.

Aspect 22 is the method of any of aspects 13 to 20, where the set of resource allocations is a set of slots or a set of symbols, and where the power adjustment is associated with: (1) a change in power for the set of slots or the set of symbols from the first time instance to the second time instance; and (2) a number of slots or symbols to which the power adjustment is applied.

Aspect 23 is the method of aspect 22, where transmitting the indication of the power adjustment between the set of resource allocations from the first time instance to the second time instance includes: transmitting, at one slot or symbol prior to the second time instance, the indication of the power adjustment between the set of resource allocations from the first time instance to the second time instance.

Aspect 24 is the method of any of aspects 13 to 23, where the method further includes: receiving a capability indication prior to transmitting the indication of the power adjustment, where the capability indication indicates the capability of the wireless device to adjust a power BO of the wireless device.

Aspect 25 is the method of aspect 24, where transmitting the indication of the power adjustment between the set of resource allocations from the first time instance to the second time instance includes: transmitting, in response to the capability indication indicating the wireless device having the capability to adjust the power BO, the indication of the power adjustment.

Aspect 26 is the method of any of aspects 13 to 25, where the wireless device is at least one repeater, at least one repeating device, or at least one controller.

Aspect 27 is the method of any of aspects 13 to 26, where the indication is transmitted via a PDCCH or a MAC-CE.

Aspect 28 is an apparatus for wireless communication at a wireless device, including: a memory; and at least one processor coupled to the memory and, based at least in part on information stored in the memory, the at least one processor is configured to perform the method of any of aspects 1-12.

Aspect 29 is the apparatus of aspect 28, further including at least one of a transceiver or an antenna coupled to the at least one processor.

Aspect 30 is an apparatus for wireless communication including means for implementing the method of any of aspects 1-12.

Aspect 31 is a computer-readable medium (e.g., a non-transitory computer-readable medium) storing computer executable code, where the code when executed by a processor causes the processor to implement the method of any of aspects 1-12.

Aspect 32 is an apparatus for wireless communication at a network node, including: a memory; and at least one processor coupled to the memory and, based at least in part on information stored in the memory, the at least one processor is configured to perform the method of any of aspects 13-27.

Aspect 33 is the apparatus of aspect 32, further including at least one of a transceiver or an antenna coupled to the at least one processor.

Aspect 34 is an apparatus for wireless communication including means for implementing the method of any of aspects 13-27.

Aspect 35 is a computer-readable medium (e.g., a non-transitory computer-readable medium) storing computer executable code, where the code when executed by a processor causes the processor to implement the method of any of aspects 13-27.

What is claimed is:

1. An apparatus for wireless communication at a wireless device, comprising:
   memory; and
   at least one processor coupled to the memory and, based at least in part on information stored in the memory, the at least one processor is configured to:
   receive an indication of a power adjustment between a set of resource allocations from a first time instance to a second time instance, wherein the set of resource allocations is associated with first wireless communication between a network node and a user equipment (UE) via the wireless device, wherein the first wireless communication between the network node and the UE is a multi-hop communication including a plurality of hops; and adjust a power backoff (BO) of the wireless device based on the indication of the power adjustment between the set of resource allocations, and wherein to adjust the power BO of the wireless device, the at least one processor is configured to:

adjust, based on a location of the wireless device in the plurality of hops, a maximum emitted power of a power amplifier (PA) at the wireless device or a signal power level for the PA at the wireless device.

2. The apparatus of claim 1, wherein, to adjust the power BO of the wireless device, the at least one processor is configured to:

adjust, in response to the wireless device not being at a last hop of the plurality of hops, the maximum emitted power of the PA at the wireless device.

3. The apparatus of claim 1, wherein, to adjust the power BO of the wireless device, the at least one processor is configured to:

adjust, in response to the wireless device being at a last hop of the plurality of hops, the signal power level for the PA at the wireless device.

4. The apparatus of claim 1, wherein the adjustment of the maximum emitted power of the PA corresponds to a first adjustment to a power consumption of the wireless device, and wherein the adjustment of the signal power level for the PA corresponds to a second adjustment to a link budget of an access channel or a backhaul channel.

5. The apparatus of claim 1, wherein the set of resource allocations is a set of consecutive resource allocations or a set of non-consecutive resource allocations, and wherein the power adjustment is a difference in power between the set of resource allocations at the first time instance compared to the second time instance.

6. The apparatus of claim 1, wherein the set of resource allocations is a set of slots or a set of symbols, and wherein the power adjustment is associated with:

(1) a change in power for the set of slots or the set of symbols from the first time instance to the second time instance; and (2) a number of slots or symbols to which the power adjustment is applied.

7. The apparatus of claim 6, wherein, to receive the indication of the power adjustment between the set of resource allocations from the first time instance to the second time instance, the at least one processor is configured to:

receive, at one slot or one symbol prior to the second time instance, the indication of the power adjustment between the set of resource allocations from the first time instance to the second time instance.

8. The apparatus of claim 1, wherein the at least one processor is further configured to:

transmit a capability indication to the network node prior to receiving the indication of the power adjustment, wherein the capability indication indicates a capability of the wireless device to adjust the power BO of the wireless device.

9. The apparatus of claim 1, wherein the indication of the power adjustment is a first indication of the power adjustment, the network node is a first network node associated with a plurality of network nodes, wherein the at least one processor is further configured to:

receive a second indication of the power adjustment between a second set of resource allocations from the first time instance to the second time instance, wherein the second set of resource allocations is associated with second wireless communication between a second network node and the wireless device, and wherein to adjust the power BO of the wireless device, the at least one processor is configured to:

adjust the power BO of the wireless device based on the first indication and the second indication.

10. The apparatus of claim 1, wherein to receive the indication, the at least one processor is configured to receive the indication from the network node, and the wireless device is at least one repeater, at least one repeating device, or at least one controller.

11. The apparatus of claim 1, further comprising at least one of a transceiver or an antenna coupled to the at least one processor, wherein at least one of the transceiver or the antenna is configured to receive the indication via a physical downlink control channel (PDCCH) or a medium access control (MAC) control element (MAC-CE).

12. An apparatus for wireless communication at a network node, comprising:

memory; and at least one processor coupled to the memory and, based at least in part on information stored in the memory, the at least one processor is configured to:

measure, for a wireless device, a power adjustment between a set of resource allocations from a first time instance to a second time instance, wherein the set of resource allocations is associated with first wireless communication between the network node and a user equipment (UE) via the wireless device, wherein the first wireless communication between the network node and the UE is a multi-hop communication including a plurality of hops; and transmit, for the wireless device, an indication of the power adjustment between the set of resource allocations from the first time instance to the second time instance, wherein the power adjustment is associated with an adjustment in a power backoff (BO) of the wireless device, and wherein the adjustment in the power BO of the wireless device corresponds to:

an adjustment to a maximum emitted power of a power amplifier (PA) at the wireless device or a signal power level for the PA at the wireless device based on a location of the wireless device in the plurality of hops.

13. The apparatus of claim 12, wherein the adjustment in the power BO of the wireless device corresponds to:

the adjustment to the maximum emitted power of the PA at the wireless device if the wireless device is not at a last hop of the plurality of hops.

14. The apparatus of claim 12, wherein the adjustment in the power BO of the wireless device corresponds to:

an adjustment to the signal power level for the PA at the wireless device if the wireless device is at a last hop of the plurality of hops.

15. The apparatus of claim 12, wherein the power BO of the wireless device corresponds to a ratio between the maximum emitted power of the PA at the wireless device and the signal power level for the PA of the wireless device.

16. The apparatus of claim 12, wherein the at least one processor is further configured to:

measure, for each corresponding wireless device of a plurality of wireless devices, a corresponding power adjustment between a corresponding set of resource allocations from the first time instance to the second time instance, wherein each of the plurality of wireless devices corresponds to a hop in the plurality of hops, and wherein the set of resource allocations is associated with the first wireless communication between the network node and the UE via the corresponding wireless device; and transmit, to each wireless device of the plurality of wireless devices, a second indication of the corresponding power adjustment between the set of resource allocations from the first time instance to the second time instance.

17. The apparatus of claim 12, wherein the adjustment to the maximum emitted power of the PA corresponds to a first adjustment in a power consumption of the wireless device, and wherein the adjustment to the signal power level for the PA corresponds to a second adjustment in a link budget of an access channel or a backhaul channel.

18. The apparatus of claim 12, wherein the set of resource allocations is a set of consecutive resource allocations or a set of non-consecutive resource allocations, and wherein the power adjustment is a difference in power between the set of resource allocations at the first time instance compared to the second time instance.

19. The apparatus of claim 12, wherein the set of resource allocations is a set of slots or a set of symbols, and wherein the power adjustment is associated with:
(1) a change in power for the set of slots or the set of symbols from the first time instance to the second time instance; and
(2) a number of slots or symbols to which the power adjustment is applied.

20. The apparatus of claim 19, wherein, to transmit the indication of the power adjustment between the set of resource allocations from the first time instance to the second time instance, the at least one processor is configured to:
transmit, at one slot or symbol prior to the second time instance, the indication of the power adjustment between the set of resource allocations from the first time instance to the second time instance.

21. The apparatus of claim 12, wherein the at least one processor is further configured to:
receive a capability indication prior to transmitting the indication of the power adjustment, wherein the capability indication indicates a capability of the wireless device to adjust a power BO of the wireless device.

22. The apparatus of claim 21, wherein, to transmit the indication of the power adjustment between the set of resource allocations from the first time instance to the second time instance, the at least one processor is configured to:
transmit, in response to the capability indication indicating the wireless device having the capability to adjust the power BO, the indication of the power adjustment.

23. The apparatus of claim 12, wherein the wireless device is at least one repeater, at least one repeating device, or at least one controller.

24. The apparatus of claim 12, further comprising at least one of a transceiver or an antenna coupled to the at least one processor, wherein at least one of the transceiver or the antenna is configured to transmit the indication via a physical downlink control channel (PDCCH) or a medium access control (MAC) control element (MAC-CE).

25. A method of wireless communication at a wireless device, comprising:
receiving an indication of a power adjustment between a set of resource allocations from a first time instance to a second time instance, wherein the set of resource allocations is associated with first wireless communication between a network node and a user equipment (UE) via the wireless device, wherein the first wireless communication between the network node and the UE is a multi-hop communication including a plurality of hops; and
adjusting a power backoff (BO) of the wireless device based on the indication of the power adjustment between the set of resource allocations, wherein adjusting the power BO of the wireless device comprises:
adjusting, based on a location of the wireless device in the plurality of hops, a maximum emitted power of a power amplifier (PA) at the wireless device or a signal power level for the PA at the wireless device.

26. A method of wireless communication at a network node, comprising:
measuring, for a wireless device, a power adjustment between a set of resource allocations from a first time instance to a second time instance, wherein the set of resource allocations is associated with first wireless communication between the network node and a user equipment (UE) via the wireless device, wherein the first wireless communication between the network node and the UE is a multi-hop communication including a plurality of hops; and
transmitting, for the wireless device, an indication of the power adjustment between the set of resource allocations from the first time instance to the second time instance, wherein the power adjustment is associated with an adjustment in a power backoff (BO) of the wireless device, and wherein the adjustment in the power BO of the wireless device corresponds to:
an adjustment to a maximum emitted power of a power amplifier (PA) at the wireless device or a signal power level for the PA at the wireless device based on a location of the wireless device in the plurality of hops.

* * * * *